United States Patent [19]
Friedman

[11] 3,779,009
[45] Dec. 18, 1973

[54] CATALYTIC METHOD OF PRODUCING HIGH TEMPERATURE GASES
[75] Inventor: Joseph Friedman, Encino, Calif.
[73] Assignee: Rockwell International Corporation, El Segundo, Calif.
[22] Filed: Nov. 4, 1968
[21] Appl. No.: 772,985

Related U.S. Application Data
[63] Continuation-in-part of Ser. No. 503,442, Oct. 23, 1965, abandoned.

[52] U.S. Cl................ 60/217, 60/219, 60/220, 149/1
[51] Int. Cl............................................. C06d 5/08
[58] Field of Search................. 60/219, 220, 217; 252/472; 149/1

[56] References Cited
UNITED STATES PATENTS
3,407,604   10/1968   Keith et al. .................. 60/219 X Primary Examiner—Benjamin R. Padgett
Attorney—Thomas S. MacDonald and L. Lee Humphries

[57] ABSTRACT

A system for providing high temperature gases comprising a single storage tank containing a nondetonable mixture of an inert gas, an oxidizer and a fuel. A catalytic bed is functionally connected therewith whereby the oxidizer and fuel are ignited by the catalytic bed, producing hot gases.

8 Claims, 1 Drawing Figure

INVENTOR.
JOSEPH FRIEDMAN

BY Paul L. Sabatine

ATTORNEY

CATALYTIC METHOD OF PRODUCING HIGH TEMPERATURE GASES

CROSS-REFERENCE TO RELATED APPLICATION

This application is a continuation-in-part to Applicant's copending application, U. S. Ser. No. 503,442, filed Oct. 23, 1965, now abandoned.

BACKGROUND OF THE INVENTION

This invention relates to a gas pressurization device. More particularly, this invention relates to a gas pressurization device which utilizes a mixture of an inert gas, fuel and oxidizer which is non-reactive under ordinary conditions but becomes reactive upon exposure to a catalyst to provide gas at high temperatures.

There are many examples in the prior art of systems for providing gas under pressure. This gas under pressure is utilized in many applications such as providing thrust in gas generating devices, as for example, rocket engines. Other applications include pressurizing propellant tanks for introducing propellant into a combustion chamber. Examples of devices previously used for providing gas under pressure include pumps and solid propellant gas generators. In addition, liquid propellants can be burned to provide gas under pressure. Another common method of providing pressurization is to store gas under high pressure in a storage container. Compressed gas, as stored in containers, is frequently employed for scavenging gun barrels of toxic and flammable gases and combustion residues between rounds. Compressed gas for storage containers can also be used to introduce propellant into a combustion chamber.

There are disadvantages in these prior art examples, however. Pumps, of necessity, are complex and for small generating devices are impractical. Solid propellant gas generators as well as liquid propellant gas generators are relatively complex and often require separate ignition systems and complex valving structure. In the case of stored gas under high pressure, the container is often heavy and cumbersome. In addition, high pressure containers, as the gas is exhausted, tend to undergo a pressure decay, and as a result thereof, there is not sufficient compressed gas for scavenging gun barrels of the above listed undesirable products between rounds. Also, compressed gas is usually made at a different location from the location where it is employed which means the added disadvantage of transporting heavy pressurized containers. In contrast, the gas of the present invention can be made at the location where it is employed and the invention thereby overcomes the disadvantage associated with the prior art.

This invention obviates the disadvantages of the prior art systems in that an inert gas is mixed with a fuel and oxidizer in a common storage vessel which is noncombustible except when exposed to a catalyst. Upon exposure to the catalyst, the fuel and oxidizer will combine and heat the inert gas.

An object of this invention is to provide a method of obtaining gas under pressure.

Another object of this invention is to provide an improved device for producing high temperature gases.

Yet another object of the invention is to provide a gas by mixing an inert gas, an oxidizer and a fuel and exposing said mixture to a catalyst to obtain the desired gas.

Other objects and advantages of this invention will become apparent as this description proceeds taken in conjunction with the accompanying drawing and the appended claims.

SUMMARY OF THE INVENTION

This invention is concerned with a multiple purpose gas generator system suitable for use as a primary propulsion device, as a source of hot gases for tank pressurization or auxiliary power generator, or as a source of gas for scavenging gun barrels. The gas generator system is concerned with the homogeneous addition of given quantities of combustible gases to given quantities of inert gas with subsequent catalytic ignition of the combustibles and transfer of the gaseous energy produced to a predetermined system to achieve the desired intended work.

DETAILED DESCRIPTION OF THE INVENTION

Figure 1:
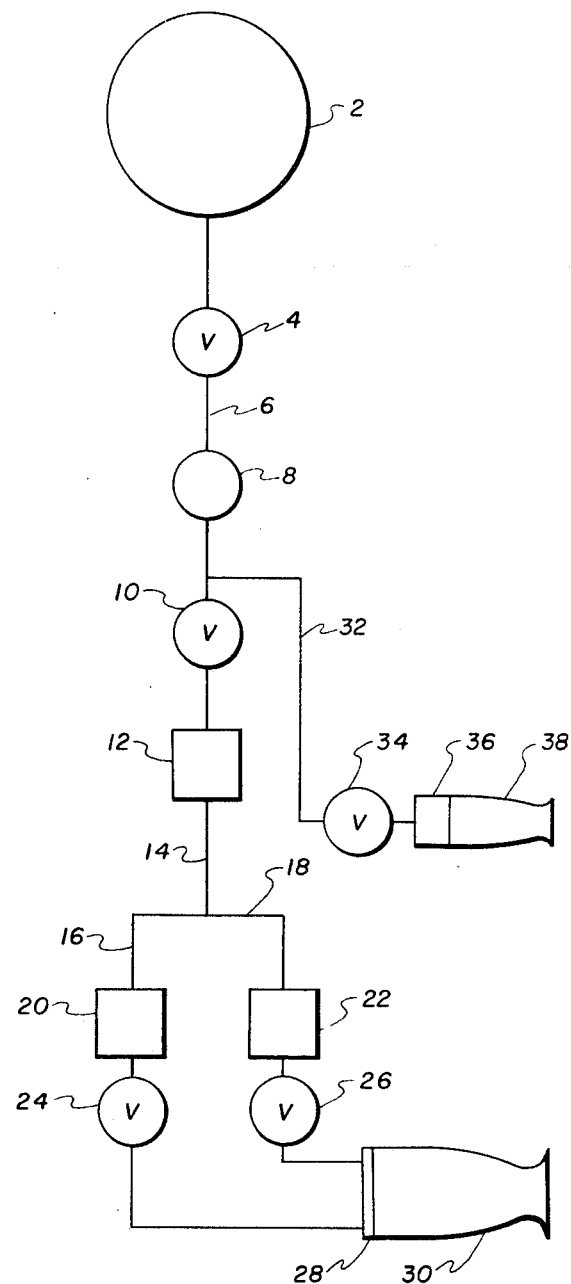

In obtaining the novel objectives and the unobvious advantages of this invention, it has now been unexpectedly found that the gas pressurizing device can be achieved by intimately mixing the inert gas with an oxidizer and a fuel and then exposing said mixture to a catalyst to cause the combustion of the fuel and the oxidizer, which combustion product intimately mixes with the inert gas, whereby the temperature and the pressure of the inert gas is increased and suitable for the utilities set forth supra.

An embodiment of this invention is set forth in the accompanying schematic FIGURE.

The FIGURE, which is illustrative of one manner in which the invention can be used, shows a tank 2 which contains the mixture of fuel, oxidizer and inert gas. Valve 4 is provided to open or close line 6. The mixture passes through a pressure regulator 8 which is used to throttle the mixture to predetermined pressure which remains constant even though pressure in tank 2 may decay. Another valve 10 is employed which, when open, allows the fluid to pass through a catalytic pack 12. When in contact with the catalyst in catalytic pack 12, the fuel and oxidizer will combine and the inert gas will be heated. This gas will pass through line 14 and then branch into lines 16 and 18 and into propellant tanks 20 and 22 respectively, thus pressurizing the propellant in these tanks. The propellant in these tanks will, in turn, pass through valves 24 and 26 respectively and then be injected through injector 28 into rocket engine 30 for combustion therein in a conventional manner.

When it is desired to provide thrust through expansion of the inert gas without the use of other propellants, the fluid from tank 2 may pass by line 32 through valve 34 and catalytic pack 36 which is located in engine 38.

A desirable mixture contained in tank 2 is hydrogen, oxygen and nitrogen. This mixture is comprised of 85 percent by volume of nitrogen, 10 percent by volume of hydrogen and 5 percent by volume of oxygen. This mixture will not burn, explode or detonate by itself, but when passed through a suitable catalyst bed will react to form a hot gas at approximately 1,500°F. This mixture will be composed of 89 percent by volume of nitrogen and 11 percent steam. Such a catalytic heated gas will produce about four times the expulsion capacity when used as a pressurant in a rocket motor feed system and about twice the specific impulse when used as propellant as compared to the conventional stored cold gas system.

The catalyst used comprises a noble metal such as gold, silver, mercury, platinum, palladium, iridium, rhodium, ruthenium and osmium. A desirable catalyst is MFSA which is manufactured by Englehardt Industries. This catalyst comprises an alumina base with platinum, rhodium and lead deposited thereon. The catalyst comes in the shape of porous spheres over which the mixture is passed. A typical, but non-limiting, example of a catalytic system is a catalyst of platinum, lead and rhodium impregnated on an alumina pellet nominally ⅛ inch in diameter. The weight percent composition of one catalyst employed herein was 23 $Al_2O_3$; 0.096 $SiO_2$; 0.13 Pt; 0.14 Rh; and 0.13 Pb. The active constitutents of this catalyst are Pt-Rh-Pb with a surface area $m^2$ per gram of 460, a pore volume, ml per gram of 0.58 and an average pore diameter of 50 $A°$. Other catalyst systems were used, such as, 1/16 with diameter spherical pellets. Generally, porous shapes and size of the catalytic system and multiple mixtures can be successfully employed for the desired thermal response.

Preferably, the volume of hydrogen should be maintained below 16 percent with the amount of oxygen equal to about half of the amount of hydrogen present. The volume, however, of hydrogen can range up to 20 percent. The upper range is dependent on the ability of the catalyst to operate. It has been found that flame temperatures about 1,500°F cause sintering or destruction of the catalyst. The lower range of hydrogen is determined by the gas flame temperature desired. The flame temperature achieved is substantially linear with the percentage of hydrogen. The desired lower end of the range is approximately 5 percent hydrogen and 2½ percent oxygen. Other fuels, like methane, can also be used; and, generally the fuels will be selected from the group consisting of hydrogen and methane and mixtures thereof, and from the broader group consisting of hydrogen, methane, ethane and mixtures thereof. It is understood that while these fuels have been described with particularity, other functionally equivalent fuels obvious to those versed in the art from a reading of this disclosure are intended to operate with the disclosed invention.

Generally, the gas used for the purpose of the present invention is nitrogen, however, other inert gases can be used such as helium, argon, zenon and krypton. For the purpose of the invention, it is desirable to increase the temperature of an inert gas selected from the group of gases consisting of nitrogen, helium, argon, zenon, krypton and mixtures thereof. Usually, the range of inert gas is about 70 to substantially 92.5 percent by volume for a single gas or a mixture of inert gas. A mixture of inert gases would comprise, for example, 70 percent by volume of nitrogen and up to 22.5 percent by volume of a second inert gas, for example, helium, argon, zenon and krypton. While the inert gases have been discussed in detail, it is to be understood that the discussion is not to be construed as limiting as other variations will be obvious in view of the present disclosure.

While the fuel and oxidizer has been described as comprising hydrogen and oxygen, it is within the scope of this invention to utilize other fuels and oxidizers. Representative of other oxidizers in addition to oxygen are air and $OF_2$. Generally, within the spirit and scope of the invention the oxidizer is selected from the group consisting of air, oxygen, oxygen difluoride and mixtures thereof. When air is used as an oxidizer, it may be suitable to be mixed with diluents to produce a diluted air mixture. For example, when air is mixed with nitrogen, to produce a diluted air, the final mixture in this case would be nitrogen enriched air.

Generally, the ratio of nitrogen to oxygen in an air-diluted mixture would be a ratio of about 20 parts of nitrogen to one part of oxygen. The amount of oxidizer employed is usually about 2½ to 10 percent by volume. A typical mixture of a fuel, hydrogen would comprise from substantially 5 to 20 percent by volume and if the oxidizer is oxygen about 2½ to 10 percent by volume is employed, the volume of hydrogen to volume of oxygen ratio being substantially 2. A typical blend of hydrogen, other operative embodiments are set forth in the following disclosure.

The following, Table 1, is a table illustrative of propellants and compositions which provide a flame temperature of approximately 1,560°F based on an initial storage temperature of 60°F.

TABLE 1

| Blend | Chemical reactants | Molar composition, percent | | | Mixture ratio, o/f | Heat of reaction,[1] calories |
| --- | --- | --- | --- | --- | --- | --- |
| | | Fuel | Oxidizer | Diluent | | |
| A | $CH_4+2O_2+28N_2$ | 3.2 | 6.4 | 90.4 | 4.0 | −191,675 |
| B | $CH_4+2O_2+40.5He$ | 2.3 | 4.6 | 93 | 4.0 | −191,675 |
| C | $2H_2+O_2+16N_2$ | 11.2 | 5.6 | 83.2 | 8.0 | −115,510 |
| D | $2H_2+O_2+24He$ | 7.4 | 3.6 | 89 | 8.0 | −115,510 |
| E | $CH_4+2OF_2+45N_2$ | 2.1 | 4.2 | 93.7 | 6.75 | −313,099 |
| F | $CH_4+2OF_2+64.5He$ | 1.5 | 3 | 95.5 | 6.75 | −313,099 |
| G | $2H_2+OF_2+24N_2$ | 7.4 | 3.7 | 88.9 | 13.5 | −175,700 |
| H | $2H_2+OF_2+35He$ | 5.3 | 2.7 | 92 | 13.5 | −175,700 |

[1] Based on the heat liberated by the reaction of the chemical reactants in column 2.
The flame temperature of approximately 1500 °F as discussed supra is based on a storage temperature of 60 °F.

In Table 2, immediately below, is presented the results of a steady state combustion test for a 5.0 molar percent oxygen, 9.8 percent hydrogen and 85.2 percent nitrogen blend. In the study the catalyst beds were varied from 0.0055 to 0.0244 lb m/sec.

TABLE 2

| Environmental temperature, F. | Flowrate, lb. m./sec. | Chamber temperature, F. | Chamber pressure, psia | Characteristic velocity, ft./sec. | Characteristic velocity efficiency, percent |
|---|---|---|---|---|---|
| 64 | 0.0132 | 784 | 89 | 2170 | 77.0 |
| 62.2 | .0151 | 793 | 104 | 2220 | 78.8 |
| 62.2 | .0105 | 763 | 74 | 2270 | 80.5 |
| 52.5 | .0143 | 565 | 91 | 2050 | 72.7 |
| 52.5 | .0142 | 548 | 91 | 2060 | 73.0 |
| 70 | .00753 | 850 | 54 | 2310 | 82.0 |
| 70 | .0088 | 850 | 64 | 2340 | 83.0 |

In Table 3, immediately below, is presented the results wherein a 2-mil tantalum foil was placed in rocket chambers to minimize the heat flux between the catalyst bed and the nozzle section. The results show an increase in velocity into a higher percent region.

TABLE 3

| Environmental temperature, F. | Flowrate, lb. m./sec. | Chamber temperature, F. | Chamber pressure, psia | Characteristic velocity, ft./sec. | Characteristic velocity efficiency, percent |
|---|---|---|---|---|---|
| 65.7 | 0.00646 | 1174 | 51 | 2540 | 90.0 |
| 64 | .00700 | 1173 | 56 | 2580 | 91.5 |
| 64 | .00792 | 1194 | 64 | 2600 | 92.2 |
| 64 | .00792 | 1194 | 64 | 2600 | 92.2 |
| 64 | .00950 | 1173 | 76 | 2580 | 91.5 |
| 64 | .00970 | 1173 | 76 | 2520 | 89.4 |
| 64 | .0108 | 1194 | 89 | 2650 | 94.0 |
| 64 | .0108 | 1194 | 89 | 2650 | 94.0 |
| 64 | .00450 | 1909 | 34 | 2430 | 86.2 |

In Table 4 is presented the results of a steady state ignition test using a lightweight engine without an inner tantalum chamber. In this study the reactor was wrapped with asbestos to minimize radiation of heat from the engine. The catalyst bed used was ¾ inches, the chamber temperature was 1,186°F to produce effective characteristic velocity efficiencies from 87 percent to 94 percent.

that flowed during a test was determined by measuring the chamber in pressure and temperature of the blend in the pulse tank for the series of pulses. Knowing the number of pulses and assuming equal time lengths and characteristics for each pulse, the amount of propellant that flowed per pulse was obtained. To obtain an effective flowrate, an appropriate time interval was defined as the time between initial movement of the valve poppet upon opening and final movement upon closing. The times for each pulse were readily available from the current flow through the valve solenoid as monitored on oscillograph for each pulse in the same manner as the valve calibration tests. The total propellant

TABLE 4

| Environmental temperature, F. | Flowrate, lb. m./sec. | Chamber temperature, F. | Chamber pressure, psia | Characteristic velocity, ft./sec. | Characteristic velocity efficiency, percent |
|---|---|---|---|---|---|
| 69.5 | 0.00546 | 1038 | 42 | 2470 | 87.7 |
| | .00624 | 1080 | 49 | 2525 | 89.5 |
| | .00787 | 1122 | 62 | 2540 | 90 |
| | .00787 | 1122 | 62 | 2540 | 90 |
| | .00950 | 1165 | 76 | 2575 | 91.2 |
| | .00954 | 1186 | 77 | 2600 | 92.2 |
| | .0123 | 1186 | 99 | 2610 | 92.5 |
| | .00464 | 1072 | 36 | 2500 | 88.7 |
| | .00495 | 1122 | 39 | 2540 | 90 |
| | .00620 | 1131 | 49 | 2545 | 90.2 |

Further studies were made using the pulse mode tests to ascertain if the system could be repeatedly fired. The pulse mode studies were conducted with the lightweight engine at a simulated altitude of 100,000 feet. The catalyst bed length was ¾ inch, and three to four layers of asbestos tape were wrapped around the engine to retain the heat that the engine hardware gained. A tantalum inner chamber was fabricated and inserted into the combustion chamber to minimize the thermal delay of the entire system. The amount of propellant that flowed per pulse was determined and reported in Table 5 following as the operating efficiencies of the pulse mode test. In the table below:

[1]C means cold catalyst bed;

[2]T means transient condition or warming catalyst bed;

[3]H means hot catalyst bed;

[4]$\eta_T$ means thermodynamic efficiency at $T_c/T_{theor}$ where $T_{theor} = 1,460R$;

[5] $\eta_c$ means the characteristic velocity efficiency of $\sqrt{\eta_T}$;

The figure 6 refers to the steady-state relationship where C equals $P_c A_t C_F / \dot{w}$ for the pulses 30 milliseconds or larger (theoretical) of 2,840 ft/sec.

TABLE 5

| Number of pulses | Maximum operating parameters | | | | | | Maximum | | $\eta_{c*}^6$ | | |
|---|---|---|---|---|---|---|---|---|---|---|---|
| | Chamber pressure, psia | | | Chamber temperature, F. | | | | | | | |
| | $C^1$ | $T^2$ | $H^3$ | C | T | H | $\eta_T^4$ | $\eta_{c*}^5$ | C | T | H |
| 115 | 71 | 72 | 73 | | | | | | | | |
| 116 | 79 | 91 | 94 | 180 | 561 | 667.5 | 57.8 | 77 | 89 | 102.5 | 106 |
| 57 | 81 | 84 | 90 | 160 | 245 | 434 | 46.7 | 68.2 | 91.3 | 94.5 | 101.5 |
| 191 | 69 | 83 | 84 | 150 | 555 | 666 | 57.6 | 76 | 81.3 | 98 | 99 |
| 52 | 79 | 79 | 81 | 255 | 371 | 408 | 44.3 | 66.4 | | | |
| 67 | 71 | 7 | 74 | 250 | | 517 | 50 | 70.7 | | | |
| 35 | 67 | 68 | 68 | 177 | 271 | 312 | 39.4 | 62.7 | | | |
| 44 | 62 | 62 | 66 | 115 | 190 | 240 | 35.7 | 59.8 | | | |
| 349 | 57 | 73 | 78 | 140 | 440 | 749 | 61.8 | 78.5 | | | |
| 226 | 60 | 70 | 78 | 160 | 390 | 723 | 60.6 | 77.8 | | | |

In operation, when valve 4 is open and valve 10 is open, the mixture will pass over catalyst bed 12 and combustion of the fuel and oxidizer will occur thus providing gas for pressurizing tanks 20 and 22 for ultimate injection of the propellants therein into engine 30. When valve 34 is open, the mixture will pass over catalyst bed 36 causing hot gas to exit through engine 38 to provide propulsion such as for attitude control in spacecraft.

Other utilities, for the gas generator system, in addition to the propellant system as set forth supra, include the scavenging function of expelling gases from gun barrels, ullage gas in a propellant system and other uses where gas may be suitably used. Generally, the gas system can be employed where similar compressed gas systems can be used in science and commerce.

Obviously, many modifications and variations of the instant invention are possible in the light of the above teachings, and it is, therefore, to be understood that within the scope of the claim, the invention may be practiced otherwise as specifically described.

I claim:

1. A method of providing high temperature gases, comprising mixing a fuel selected from the group consisting of hydrogen, methane, ethane and mixtures thereof and an oxidizer selected from the group consisting of air, oxygen, oxygen difluoride and mixtures thereof with a sufficient quantity of gas which is inert with respect to said fuel and oxidizer to provide a gaseous mixture which is noncombustible except when contacted with a catalyst which will catalyze the combustion of said fuel and oxidizer in said gaseous mixture and subsequently reacting said fuel and oxidizer by contacting said gaseous mixture with said catalyst, said catalyst being selected from the group consisting of platinum, palladium, iridium, rhodium, ruthenium, osmium and mixtures thereof.

2. The method of claim 1 in which the gas which is inert with respect to the fuel and oxidizer is selected from the group consisting of nitrogen, helium, argon, xenon, krypton and mixtures thereof.

3. A method of providing high temperature gases, comprising mixing hydrogen and oxygen with a sufficient quantity of gas which is inert with respect to said hydrogen and oxygen to provide a gaseous mixture which is noncombustible except when contacted with a catalyst which will catalyze the combustion of said hydrogen and oxygen in said gaseous mixture and subsequently reacting said hydrogen and oxygen by contacting said gaseous mixture with said catalyst, said catalyst being selected from the group consisting of platinum, palladium, iridium, rhodium, ruthenium, osmium and mixtures thereof.

4. The method of claim 3 in which the gas which is inert with respect to the hydrogen and oxygen is nitrogen.

5. The method of claim 3 in which hydrogen comprises about 5 to 20 volume percent of the gaseous mixture, oxygen comprises about 2½ to 10 volume percent of the gaseous mixture, nitrogen comprises about 70 to 92.5 volume percent of the gaseous mixture and the ratio of the volume of hydrogen to the volume of oxygen in the gaseous mixture is about 2.

6. A method of providing high temperature gases, comprising mixing hydrogen and oxygen with a sufficient quantity of gas which is inert with respect to said hydrogen and oxygen to provide a gaseous mixture which is noncombustible except when contacted with a catalyst which will catalyze the combustion of said hydrogen and oxygen in said gaseous mixture and subsequently reacting said hydrogen and oxygen by contacting said gaseous mixture with, said catalyst being substantially comprised of platinum.

7. The method of claim 6 in which the catalyst is substantially comprised of platinum deposited on an alumina base.

8. The method of claim 6 in which the catalyst is substantially comprised of a mixture of platinum and rhodium deposited on an alumina base.

* * * * *